US012580944B2

(12) United States Patent
Davraev et al.

(10) Patent No.: US 12,580,944 B2
(45) Date of Patent: Mar. 17, 2026

(54) INHERITING SECURITY RISKS FOR CLOUD ENTITIES IN A CLOUD COMPUTING SYSTEM

(71) Applicant: Microsoft Technology Licensing, LLC, Redmond, WA (US)

(72) Inventors: Daniel Davraev, Or Yehudal (IL); Josef Weizman, Haifa (IL); Ram Haim Pliskin, Rishon Lezion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 18/470,229

(22) Filed: Sep. 19, 2023

(65) Prior Publication Data

US 2025/0097251 A1      Mar. 20, 2025

(51) Int. Cl.
*H04L 9/40*          (2022.01)

(52) U.S. Cl.
CPC ........ *H04L 63/1433* (2013.01); *H04L 63/105* (2013.01)

(58) Field of Classification Search
CPC ............... H04L 63/1433; H04L 63/105; H04L 63/1416; H04L 63/102; G06F 21/554; G06F 21/577; G06F 21/6218
See application file for complete search history.

(56) References Cited

U.S. PATENT DOCUMENTS

| | | | |
|---|---|---|---|
| 9,225,741 B1 | 12/2015 | Risher et al. | |
| 10,686,792 B1 * | 6/2020 | Keefer | .................. H04L 67/53 |
| 11,677,791 B1 * | 6/2023 | Dunkel | ................. H04L 63/205 |
| | | | 726/1 |
| 2007/0143851 A1 * | 6/2007 | Nicodemus | ......... G06F 11/3495 |
| | | | 726/4 |

(Continued)

FOREIGN PATENT DOCUMENTS

| | | | | | |
|---|---|---|---|---|---|
| CN | 118432945 A | * | 8/2024 | ............... | H04L 9/40 |
| GB | 2614460 A | * | 7/2023 | ........... | H04L 9/0891 |
| WO | 2023049908 A1 | | 3/2023 | | |

OTHER PUBLICATIONS

Al-Haj, et al., "Security-Aware Resource Allocation in Clouds", In Proceeding of IEEE 10th International Conference on Services Computing, Oct. 31, 2013, pp. 400-407.

(Continued)

*Primary Examiner* — Sarah Su
(74) *Attorney, Agent, or Firm* — Ray Quinney & Nebeker P.C.; Christopher K. Hallstrom

(57)          ABSTRACT

The disclosure focuses on using a risk inheritance system to actively prevent unauthorized and compromising activity within a cloud computing system by causing user risk scores to be inherited across downstream cloud entities within the cloud computing system. The risk inheritance system ensures that users with risky user risk scores are unable to circumvent the security measures of the cloud computing system through propagation events. For instance, the risk (Continued)

600

Generating A First User Risk Score For A First User In Response To A Sign-In Event *610*

Detecting A Cloud Entity Propagation Event For A Cloud Entity *620*

Assigning The First User Risk Score To The Second Cloud Identifier *630*

Restricting The Cloud Entity From Accessing Cloud Resources Based On Being Assigned The First User Risk Score *640* inheritance system assigns user risk scores to be inherited from a cloud entity of a user to another cloud entity, including other users and service principals, based on detecting the user initiating a propagation event. This way, the risk inheritance system improves the efficiency of the cloud computing system by ensuring that cloud entities are assigned accurate user risk scores.

20 Claims, 8 Drawing Sheets

(56) References Cited

U.S. PATENT DOCUMENTS

| | | | |
|---|---|---|---|
| 2017/0286653 A1 | 10/2017 | Moore | |
| 2018/0063164 A1* | 3/2018 | Balasubramanian | ........................ H04L 63/1433 |
| 2018/0375886 A1* | 12/2018 | Kirti | ........................ H04L 67/10 |
| 2019/0347589 A1 | 11/2019 | Sullivan et al. | |
| 2020/0145447 A1* | 5/2020 | Coffey | ................ H04L 63/1425 |
| 2020/0195693 A1 | 6/2020 | Price et al. | |
| 2021/0185094 A1 | 6/2021 | Waplington et al. | |
| 2021/0409441 A1* | 12/2021 | Singh | .................. H04L 63/1433 |
| 2022/0029882 A1 | 1/2022 | Sarukkai | |
| 2022/0131883 A1 | 4/2022 | Wolff et al. | |
| 2022/0300609 A1* | 9/2022 | Cotaie | ...................... G06N 7/01 |
| 2022/0366039 A1 | 11/2022 | Hen et al. | |
| 2023/0113621 A1 | 4/2023 | Griffin et al. | |
| 2023/0132611 A1 | 5/2023 | Hen et al. | |
| 2023/0247040 A1* | 8/2023 | Luttwak | ................ G06F 21/554 726/22 |
| 2024/0169343 A1* | 5/2024 | Gonzalez | ............. G06Q 20/204 |
| 2025/0055870 A1* | 2/2025 | Viswambharan | ....... H04L 63/08 |

OTHER PUBLICATIONS

Kaliski, et al., "Toward Risk Assessment as a Service in Cloud Environments", In Proceedings of USENIX Workshop on Hot Topics in Cloud Computing, Jun. 2010, 7 Pages.
Masky, et al., "A Novel Risk Identification Framework for Cloud Computing Security", In Proceedings of 2nd International Conference on Information Science and Security, Jan. 7, 2016, 4 Pages.
International Search Report and Written Opinion received for PCT Application No. PCT/US2024/043119, Dec. 9, 2024, 14 pages.

* cited by examiner

100

Creating A New User

Inviting A Guest User

Assigning Roles To Another User

Time:   A  ————————→  B  ————————→  C

Creating A New Service Principal

Time: A ⟶ B ⟶ C

Assigning Roles To A Service Principal

Time: A ⟶ B ⟶ C

600

Generating A First User Risk Score For A First User
In Response To A Sign-In Event _610_

Detecting A Cloud Entity Propagation Event For A Cloud Entity _620_

Assigning The First User Risk Score To The Second Cloud Identifier _630_

Restricting The Cloud Entity From Accessing Cloud Resources
Based On Being Assigned The First User Risk Score _640_

700

INHERITING SECURITY RISKS FOR CLOUD ENTITIES IN A CLOUD COMPUTING SYSTEM

BACKGROUND

In recent years, there has been significant progress in both hardware and software within computing devices, with a particularly notable focus on advancements in cloud computing systems. These advances, however, have coincided with a surge in cloud-based security threats as malicious entities actively seek unauthorized access to these systems. A significant proportion of these attacks revolves around compromising user accounts and service principals, often facilitated by the discovery of leaked credentials, ultimately enabling unauthorized entry into organizations hosted on cloud computing platforms. Despite the implementation of multiple security measures within cloud computing systems to thwart such attacks, unauthorized access to user data and cloud services remains an ongoing concern.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
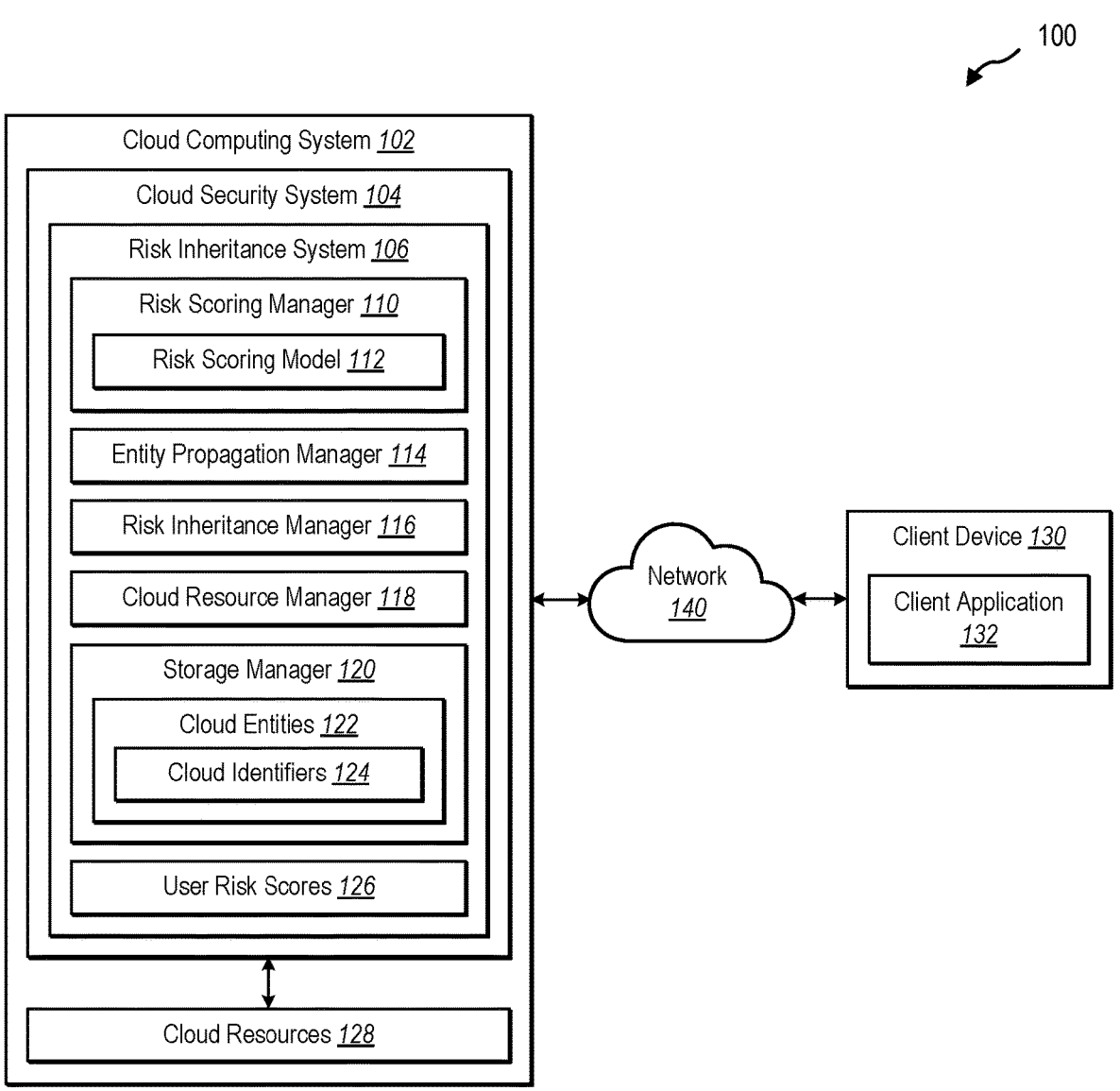
FIG. 1 illustrates an example computing environment where a risk inheritance system is implemented in a cloud computing system.

This disclosure describes using a risk inheritance system (i.e., a cloud entity risk inheritance system) to actively reduce unauthorized and compromising activity within a computer networking environment (e.g., a cloud computing system) by causing user risk scores to be inherited across downstream cloud entities within the networking environment. In particular, the risk inheritance system ensures that users with high risk scores are unable to circumvent the security measures of the cloud computing system through propagation events. For instance, the risk inheritance system assigns user risk scores to be inherited from a cloud entity of a user to another cloud entity, including other users and service principals, based on detecting the user initiating a propagation event. This way, the risk inheritance system improves the efficiency of the cloud computing system by ensuring that cloud entities are assigned accurate user risk scores.

To illustrate, in various implementations, when a user signs into the cloud computing system, the risk inheritance system generates a user risk score for the user (e.g., for the user's cloud identifier). The risk inheritance system then detects the user initiating a propagation event for a cloud entity involving the user. For example, the propagation event may include creating a new cloud entity or assigning roles within the cloud computing system to an existing cloud identifier. In response, the risk inheritance system assigns the user risk score of the user to the cloud entity identified in the propagation event. Based on the cloud entity inheriting the user risk score of the original user, the risk inheritance system and/or the cloud computing system may restrict the cloud entity from accessing the cloud resources of the cloud computing system, depending on the second cloud entity having a risky user risk score.

For context, a cloud computing system, including a multi-cloud system, provides several services and applications to users. When users sign into the cloud computing system, a user risk score (e.g., a security risk assessment score) is generated for the user indicating their current risk levels. The user risk score is often calculated by correlating user characteristics, suspicious activities, and high-risk triggers detected for the user. Based on their user risk score, the system allows or prevents the user from accessing cloud data and services.

Some users with a poor user risk score attempt to circumvent the security measures of the cloud computing system by using other cloud entities of the system to perform potentially malicious activities. As one example, a user with a poor risk score generates a new user or guest user with a less risky score. As another example, the user uses a security service principal as a proxy to perform activities within the system since service principals lack typically the data necessary to determine their own risk scores and traditionally do not have risk scores. However, as described in this disclosure, the risk inheritance system prevents these actions by users attempting to evade the security measures of the cloud computing system.

As described in this disclosure, including the following paragraphs, the risk inheritance system delivers several significant technical benefits in terms of computing efficiency, accuracy, and flexibility compared to existing systems. Moreover, the risk inheritance system provides several practical applications that address problems related to preventing actors from circumventing the security measures of the cloud computing system.

To illustrate, by assigning user risk scores to downstream cloud entities, the risk inheritance system improves the efficiency and accuracy of the cloud computing system. In particular, by preventing malicious actors from circumventing the security measures of the cloud computing system, the risk inheritance system significantly reduces or eliminates malicious activities that waste system resources and hinder the operations of the cloud computing system. Additionally, by assigning user risk scores to downstream cloud entities, the risk inheritance system ensures that cloud entities are accurately represented as indirectly belonging to a high-risk user, further improving and enhancing the security detection capabilities of the cloud computing system.

In various implementations, the risk inheritance system assigns a user risk score to a service principal within the cloud computing system. Traditionally, due to the rigidity of existing systems, service principals did not have a risk score (e.g., a security risk assessment score). The risk inheritance system improves flexibility in the cloud computing system by enabling service principals to be assigned user risk scores when the service principal is created and/or allocated a role by a high-risk user. Additionally, by enabling and supporting risk scores for service principals, the risk inheritance system once again improves the efficiency and accuracy of the cloud computing system. In particular, the risk inheritance system ensures that service principals corresponding to high-risk users do not waste cloud resources by performing unauthorized cloud operations or improperly accessing cloud data.

As illustrated in the foregoing discussion, this disclosure uses a variety of terms to describe the features and advantages of one or more implementations described. To clarify, this disclosure describes a risk inheritance system in the context of a cloud computing system. For example, the terms "cloud computing system" and cloud computing environment" refer to a network of interconnected computing devices that provide various services and applications to computing devices (e.g., server devices and client devices) inside or outside of the cloud computing system. Typically, a cloud computing system is associated with organizations that provide services and manage data for their customers. For instance, the cloud computing system is a cloud-based identity and access management service that assists organizations in managing and securing user identities while providing seamless access to various cloud-based and on-premises applications and resources. In some cases, the cloud computing system includes a security-based service such as MICROSOFT DEFENDER for Cloud. In various implementations, a cloud computing system represents a multi-cloud system.

In this disclosure, the term "user risk score" refers to a security risk assessment score serving as a quantitative measure or rating that assesses the security level of potential risk associated with a specific user or account within the cloud environment. A user risk score is often determined by a risk score model, which may include a machine-learning model, when a user signs into the cloud computing system. In various instances, a user risk score is based on factors and features such as login patterns, login location, Internet Protocol (IP) address, user agent information, access privileges, historical activity, and compliance with security policies.

In addition, the term "cloud entity" refers to a component or element within a cloud computing system. Cloud entities include users, service principals, virtual machines, storage resources, databases, and applications. Cloud entities can be physical or virtual and interact with each other to deliver various cloud services and functionalities. Cloud entities are identified based on cloud identities. In addition, as used herein, a user may refer interchangeably to an individual associated with a user account or, in some instances, to the user account or to a user identifier associated with the user account.

As used in this disclosure, the term "cloud identifier" refers to a unique label or attribute used to distinguish and identify entities or resources within an environment of network devices, such as a distributed network or cloud computing environment. A cloud identifier can include a name, number, or string of characters associated with network resources such as virtual machines, storage buckets, databases, or services. Cloud identifiers include entity identifiers such as user identifiers and service identifiers (e.g., service principal identifiers). For instance, a user identifier may identify a user entity associated with creation of a user account or cloud-based service while a service identifier may identify an instance of a service, container, virtual machine, or other entity created in connection with a user account. Indeed, cloud identifiers may refer to a variety of entities and may be referred to using resource names, resource identifiers, or URLs for websites and applications (e.g., cloud-hosted websites and/or applications). In addition, while one or more embodiments described herein refer specifically to cloud-based services and identifiers associated with users or services of a cloud computing system, it will be appreciated that cloud-based implementations described herein may refer more broadly to a variety of groupings of network devices that would benefit from a reduction in risky network behavior.

The term "service principal" refers to a security identity used by applications, services, or other resources in the cloud computing system for authentication and interactions. Often, a service principal acts as a non-human entity representing an application or service rather than a user. In various implementations, service principals are used for scenarios like application-to-application authentication, where a service or application needs to programmatically access cloud resources without human intervention. Service principals are assigned a unique identifier (e.g., a cloud identifier) and can be granted permissions (e.g., role-based access control) to access specific cloud resources.

The term "sign-in event" refers to an occurrence where a user or entity attempts to log into a computer networking environment. For instance, a sign-in event may refer to a user logging into a cloud-based service, platform, or resource within a cloud computing system. A sign-in event is typically recorded and logged for security and auditing purposes. It includes information such as a user's identity (e.g., a user identifier), the date and time of the login, the location or IP address from which the sign-in occurred, and sometimes additional details about the authentication method used. As mentioned earlier, the risk inheritance system determines a user risk score for a user in response to detecting a sign-in event.

The term "cloud entity propagation event" refers to an event where a cloud entity is being created or modified within the cloud computing system. For example, a cloud entity propagation event includes data, configurations, or resources related to a particular cloud entity being created, synchronized, replicated, distributed, and/or modified within the cloud computing system. A cloud entity propagation event may include creating a new cloud entity such as a new user or service principal, creating a guest user, and/or assigning roles from one user to another cloud entity. In this disclosure, a user often initiates and/or triggers a cloud entity propagation event.

Additional terms are defined throughout the disclosure in connection with various examples and contexts.

Additional example implementations and details of the risk inheritance system are discussed in connection with the accompanying figures. To illustrate, FIG. 1 shows an example of a computing environment 100 implementing a risk inheritance system 106. The computing environment 100 includes various computing devices associated with the risk inheritance system 106. The computing environment 100 may include additional devices and components not shown. Additionally, while FIG. 1 shows example arrangements and configurations of a risk inheritance system and associated components, other arrangements and configurations are possible.

As shown, the computing environment 100 includes a cloud computing system 102 and a client device 130 connected via a network 140. The cloud computing system 102 includes a cloud security system 104 and cloud resources 128. Each of these systems and/or components may be implemented on one or more computing devices, such as on one or more server devices. Further details regarding these and other computing devices are provided below in connection with FIG. 7, along with additional details regarding networks, such as the network 140 shown.

In one or more implementations, the cloud security system 104 manages security measures of the cloud computing system, such as monitoring security incidents, generating security alerts, and providing authorized access to the cloud resources 128. Additionally, in various instances, the cloud security system 104 provides interfaces, tools, services, and frameworks to detect, process, investigate, and modify security measures within the cloud computing system 102.

As just mentioned, in various implementations, the cloud security system 104 communicates with the cloud resources 128 to authorize access. For example, in some instances, the cloud security system 104 determines whether to grant a cloud entity access to the cloud resources 128 based on a user risk score of the cloud entity. For instance, the cloud security system 104 prohibits a high-risk user from directly or indirectly accessing cloud data and/or services associated with the cloud resources 128.

As shown, the cloud security system 104 implements the risk inheritance system 106. In some implementations, the risk inheritance system 106 is located on a different computing device than the cloud security system 104. In one or more implementations, one or more components of the risk inheritance system 106 are situated or otherwise implemented on the client device 130.

As mentioned earlier, the risk inheritance system 106 detects when users initiate cloud entity propagation events. Further, the risk inheritance system 106 causes corresponding cloud entities to inherit user risk scores to prevent risky users (i.e., high-risk users) from circumventing the security measures of the cloud computing system. In some instances, the risk inheritance system 106 communicates with the cloud security system 104 to grant or deny access to the cloud resources 128, as mentioned above.

As shown, the risk inheritance system 106 includes various components and elements, which are implemented in hardware and/or software. For example, the risk inheritance system 106 includes a risk scoring manager 110 with a risk scoring model 112, an entity propagation manager 114, a risk inheritance manager 116, a cloud resource manager 118, and a storage manager 120 with user risk scores 126 and cloud entities 122, each with cloud identifiers 124.

As mentioned, the risk inheritance system 106 includes the risk scoring manager 110. In one or more implementations, the risk scoring manager 110 manages user risk scores 126 for cloud entities 122. For example, the risk scoring manager 110 uses a risk scoring model 112 when one or more of the cloud entities 122 sign into the cloud computing system 102 to determine their user risk scores. When cloud entities 122 are identified by their cloud identifiers, the risk scoring manager 110 may associate a user risk score with a cloud identifier. Additional details regarding determining user risk scores are provided below in connection with FIG. 2.

As shown, the risk inheritance system 106 includes the entity propagation manager 114. In various implementations, the entity propagation manager 114 detects and/or implements cloud entity propagation events. For instance, the entity propagation manager 114 detects when a user initiates an entity propagation event. Examples of cloud entity propagation events include creating a new cloud entity, inviting an external guest user, assigning roles to a new user, creating a service principal as a proxy of a user, or assigning roles to a service principal. In some instances, the entity propagation manager 114 flags the user initiating the entity propagation event based on their user risk score (e.g., users with high user risk scores). Additional details regarding cloud entity propagation events are provided below in connection with FIGS. 3A-3C and FIGS. 4A-4B.

As shown, the risk inheritance system 106 includes the risk inheritance manager 116. In various implementations, the risk inheritance manager 116 assigns the user risk score of a cloud entity to another cloud entity. For example, the risk inheritance manager 116 assigns a low user risk score or a high user risk score of a first user to a downstream user or service principal associated with a cloud entity propagation event (e.g., a newly created cloud entity, an invited cloud entity, or a role-assigned cloud entity). In some implementations, the risk inheritance manager 116 updates the user risk score across downstream cloud entities. Additional details regarding assigning an inherited user risk score are provided below in connection with FIG. 2 and FIG. 5.

As shown, the risk inheritance system 106 includes the cloud resource manager 118. In various implementations, the cloud resource manager 118 manages authorized access to the cloud resources 128. In various implementations, the cloud resource manager 118 communicates with the cloud security system 104 to allow or restrict a cloud entity from accessing the cloud resources 128 based on its user risk score. Additional details regarding accessing cloud resources are provided below in connection with FIG. 2.

As shown, the computing environment 100 includes the client device 130 with a client application 132. In various implementations, the client device 130 is associated with a user, such as a user accessing the cloud computing system 102. In some implementations, the client application 132 is a web browser application, a mobile application, or another type of application that accesses internet-based content to retrieve and display digital content. In various implementations, the client application 132 enables a user to interact with the cloud security system 104 and/or the risk inheritance system 106. In some implementations, the risk inheritance system 106 performs risk inheritance assignments to cloud entities based on the detected actions of the user via the client device 130.

Figure 2:
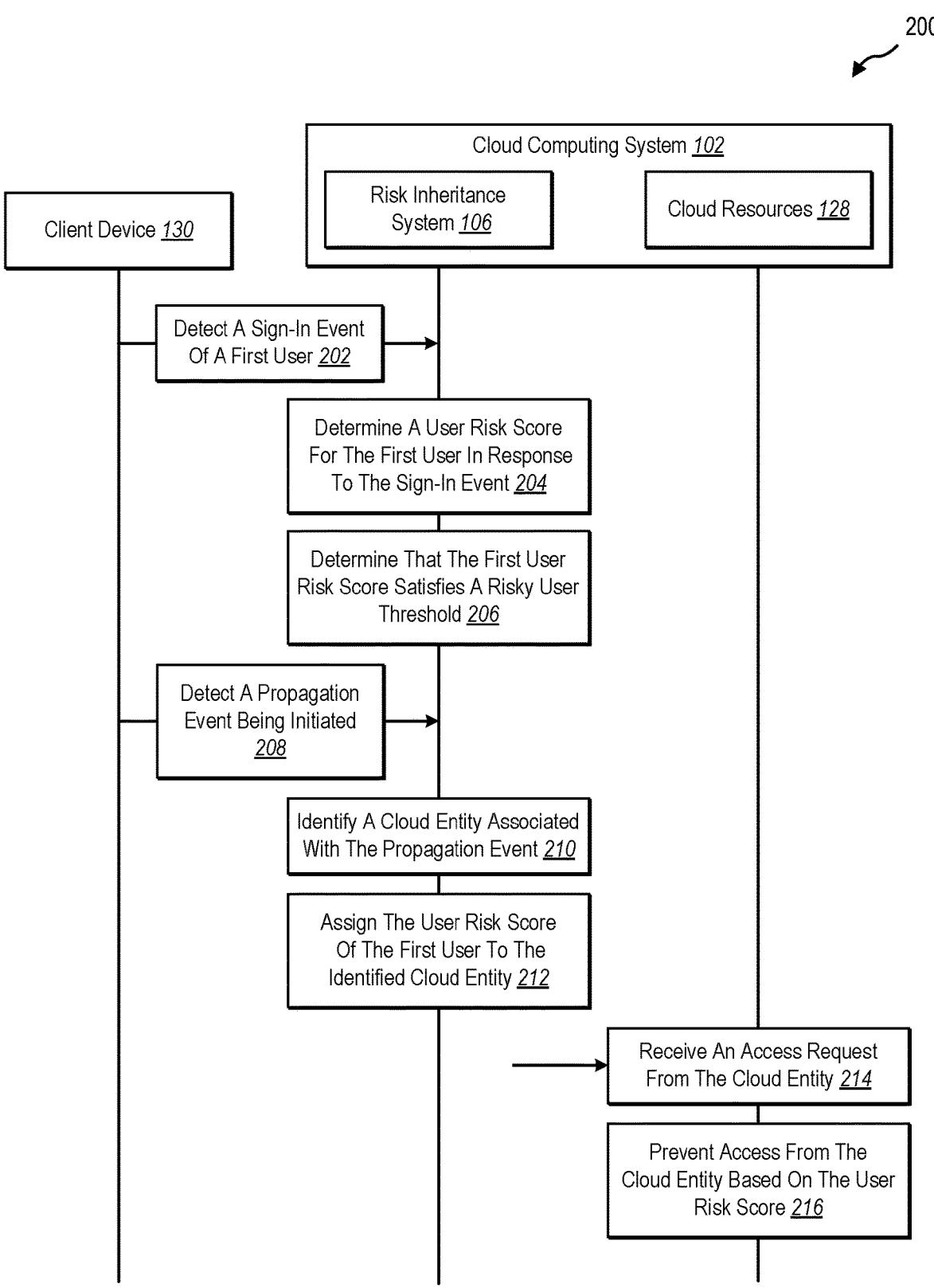
FIG. 2 illustrates an example sequence flow diagram of assigning user risk scores across cloud entities within a cloud computing system.

Additional details regarding various functions of the risk inheritance system 106 will now be described in connection with FIG. 2. To illustrate, FIG. 2 shows an example sequence flow diagram of assigning user risk scores across cloud entities within a cloud computing system according to some embodiments. As shown, FIG. 2 also includes a series of acts 200 implemented by the risk inheritance system 106 within the cloud computing system 102 in conjunction with the cloud resources 128 within the cloud computing system 102 and the client device 130, which were introduced earlier.

As shown, the series of acts 200 includes act 202 of the risk inheritance system 106 detecting a sign-in event of a first user of the client device 130. For instance, when a user (e.g., the first user) signs into a component or service implemented by the cloud computing system, the risk inheritance system 106 detects the event. Additionally, the risk inheritance system 106 identifies the cloud identifier and/or user identifier for the user. In some implementations, the risk inheritance system 106 only detects successful sign-in events of users.

In one or more implementations, the risk inheritance system 106 detects other access-based events for a user accessing the cloud computing system. For example, the risk inheritance system 106 detects if a user who was previously signed in returns to the cloud computing system before their authorization expires but after a threshold time period has passed (e.g., they return within a few hours or the next day). The risk inheritance system 106 may detect other events that correspond to a user accessing components or services implemented by the cloud computing system.

As shown, the series of acts 200 includes act 204 of determining a user risk score for the first user in response to the sign-in event. In general, risk scores (e.g., user risk scores) serve as important indicators of suspicious user activity. For instance, a user risk score serves as a primary factor or component when determining whether to allow or restrict access to cloud resources 128 of the cloud computing system 102. Indeed, the cloud computing system 102 often uses user risk scores to prevent bad behavior.

In one or more implementations, the risk inheritance system 106 uses a risk scoring model to determine a user risk score for the first user. In various implementations, the risk scoring model is a complex machine-learning model that uses algorithms to determine risk scores for users when they sign into the cloud computing system. For instance, the risk scoring model determines risk scores based on the combinations and patterns of user features. In some instances, the risk scoring model uses user characteristics and attributes such as login location, IP address, user agent information, access privileges, historical activity, and/or compliance with security policies.

In some implementations, the user risk score ranges from 0 to 100, where a higher score correlates to higher risk. For example, a user risk score of over 80 indicates a risky or high-risk user. The user risk score may use a different score range or a different rating system. For example, the risk scoring model may directly classify a user as low-risk, medium-risk, or high-risk. A user risk score may also be part of a larger risk profile associated with a user (e.g., with the user identifier of the user).

In some implementations, the user risk score is a real-time risk score based on current characteristics and attributes. In other implementations, the risk score is an aggregated risk score that combines risk scores over time. In various implementations, the risk inheritance system 106 determines or generates a risk score based on a combination of a real-time risk score and an aggregated risk score with a user identifier.

As shown, act 206 includes determining that the first user risk score satisfies a risky user threshold. For example, based on detecting the first user signing into the cloud computing system 102, the risk inheritance system 106 then determines that the first user is a risky user. In some implementations, the risk inheritance system 106 omits act 206 and skips to the next act. In some implementations, act 206 is not needed as the risk score model has classified the user as a risky or high-risk user.

In various implementations, the risk inheritance system 106 compares the user risk score for the first user (i.e., the first user risk score) to a risk threshold. For example, the risk inheritance system 106 determines whether the user risk score of the user meets or satisfies a high-risk user threshold based on the user risk score being above the risk threshold (or vice versa). In some implementations, the risk inheritance system 106 compares the user risk score to multiple risk thresholds (e.g., high, medium, low) to determine at what level of risk the user falls.

As shown, act 208 includes detecting a propagation event being initiated. For example, the risk inheritance system 106 detects a cloud entity propagation event being requested by the client device 130. For instance, the client device 130 is requesting the creation of a new cloud entity or the modification of an existing cloud entity relative to the first user cloud entity. In some implementations, the risk inheritance system 106 performs act 208 for users determined to be risky users (e.g., users above a risky user threshold). In some implementations, the risk inheritance system 106 performs act 208 for users of all risk levels. In one or more implementations, the risk inheritance system 106 determines the user initiating the propagation event within a threshold time period (e.g., within a few hours or days of signing in with a high user risk score or before being automatically signed out).

In various implementations, the risk inheritance system 106 receives an alert from the cloud security system when a user requests or performs a propagation event within the cloud computing system. As noted above, examples of cloud entity propagation events include creating a new cloud entity, inviting an external guest user, assigning roles to a new user, creating a service principal as a proxy for a user, or assigning roles to a service principal. Additional details regarding propagation events are provided below in connection with FIGS. 3A-3C and FIGS. 4A-4B.

As shown, act 210 includes identifying a cloud entity associated with the propagation event. In various implementations, in connection with detecting the propagation event initiated by the first user (e.g., the first cloud entity), the risk inheritance system 106 also determines or identifies a second cloud entity associated with the propagation event. The second cloud entity often depends on the propagation event type. For example, when creating a new user or service principal, the second cloud entity is the cloud entity being created. When assigning roles, the second cloud entity is the cloud entity to which the roles are being assigned. In some implementations, a propagation event includes multiple new or assigned cloud entities.

As shown, act 212 includes assigning the user risk score of the first user to the identifier cloud entity (e.g., the second cloud entity). For instance, the risk inheritance system 106 assigns the first user risk score of the first user to the identified cloud entity (e.g., to the cloud identifier of the identified second cloud entity). In particular, the risk inheritance system 106 causes the identified cloud entity to inherit the first user risk score of the first user. If multiple cloud entities are identified from the propagation event, then the risk inheritance system 106 assigns the first user risk score to each of the identified cloud entities.

In various implementations, the risk inheritance system 106 assigns the first user risk score to the second cloud entity when the first user is a risky user. This way, risky users are unable to circumvent the security measures of creating a new user with a lower risk score as the new user will inherit the high-risk score of the user who created the new user. In other implementations, the risk inheritance system 106 assigns the first user risk score to the second cloud entity regardless of the risk classification of the first user.

As mentioned earlier and as also discussed further below, the risk inheritance system 106 assigns the first user risk score to a service principal. While service principals traditionally lacked the data necessary to have their own risk scores determined, the risk inheritance system 106 now assigns user risk scores to service principals when created by a user having a user risk score. Again, this prevents risky users from creating a low-risk proxy to bypass the security measures of the cloud computing system and perform problematic operations.

As shown, the act 214 includes the cloud resources 128 receiving an access request from the cloud entity (not illustrated). For example, the newly created or newly role-assigned second cloud entity requests access to the cloud resources 128. In some instances, the first user requested access from the cloud resources 128 and was denied because they had a high user risk score. In response, the first user created a second user (e.g., the cloud entity) and attempted to access the cloud resources 128 with the second user.

As shown, the act 216 includes the cloud computing system 102 restricting or preventing access from the cloud entity based on the user risk score. For example, because the cloud entity (e.g., the second cloud entity) inherited the high user risk score of the first user, the cloud entity is prevented from accessing the cloud resources 128 due to its high user risk score. Indeed, but for the second cloud entity inheriting the first user risk score, the second cloud entity could access the cloud resources. In other words, preventing access to or restricting access to the cloud resources 128 would not have occurred with the second cloud entity's original (lower) risk score. In cases where a cloud entity does not have a risk score, the risk inheritance system 106 may treat it as the lowest risk score and/or always overwrite/replace/add the first user risk score to it. On the other hand, in some instances, if the cloud entity inherits a low user risk score, the cloud computing system 102 may allow access to some of the cloud resources 128 that it would otherwise not allow new users to access. In some implementations, the first user belongs to a first cloud computing system and the cloud resources belong to a different cloud computing system/ cloud provider.

In various implementations, the risk inheritance system 106 and/or the cloud computing system 102 use the user risk score as one of the factors in determining whether to allow a cloud entity to access the cloud resources 128. For example, the risk inheritance system 106 and/or the cloud computing system 102 use the user risk score of a cloud entity to determine whether the cloud entity satisfies an activity threat threshold. If the activity threat threshold is satisfied, meaning the user is likely to engage in problematic activities, then access is restricted. Otherwise, the cloud entity is permitted access to one or more of the requested cloud resources.

With an overview of the risk inheritance system 106 in place, the following figures provide additional details regarding specific components, functions, features, and actions of the risk inheritance system 106. For example, FIGS. 3A-3C correspond to user entity propagation events and FIGS. 4A-4B correspond to service principal-based propagation events.

Figure 3A:
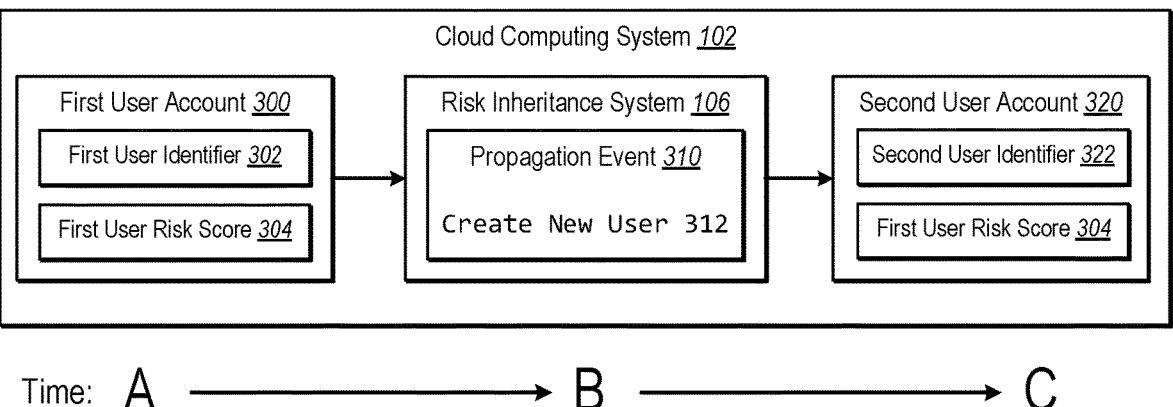
FIGS. 3A-3C illustrate block diagrams showing examples of assigning user risk scores across user entities.
Figure 3B:
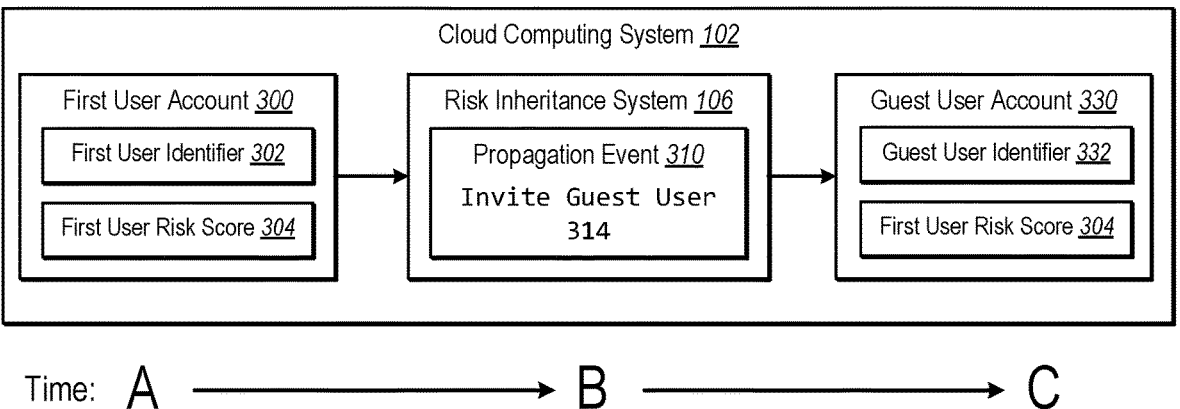
Figure 3C:
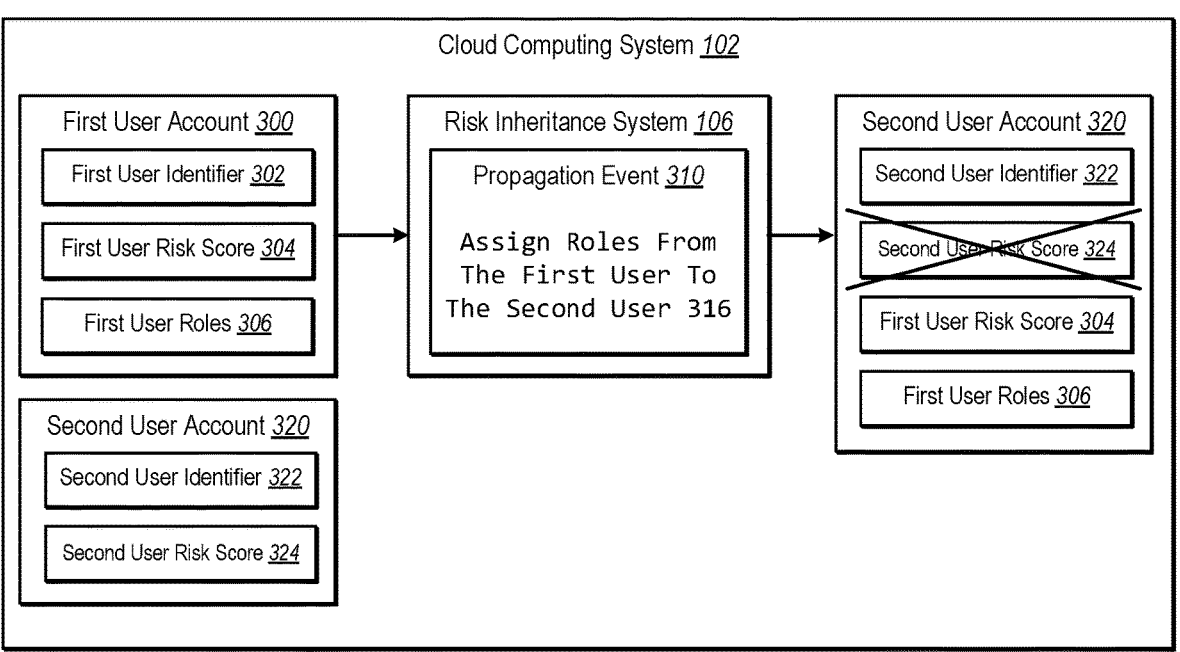
Figure 3C:

To illustrate, FIGS. 3A-3C illustrate block diagrams showing examples of assigning user risk scores across user entities according to some embodiments. As shown, FIG. 3A corresponds to the creation of a new user in the cloud computing system 102. FIG. 3A also includes a first timeline from Time A to Time B to Time C.

FIG. 3A also includes the cloud computing system 102 having a first user account 300, the risk inheritance system 106, and a second user account 320 at different times. The first user account 300 includes a first user identifier 302 and a first user risk score 304. The risk inheritance system 106 includes a propagation event 310 with a first propagation action 312, which involves creating a new user. The second user account 320 includes a second user identifier 322 and inherits the first user risk score 304.

In particular, starting at Time A, the first user account (e.g., the first user) having the first user identifier 302 signs into the cloud computing system 102. In response, the risk inheritance system 106 generates the first user risk score 304 for the first user account 300.

At Time B, the first user account 300 initiates a propagation event 310, which the risk inheritance system 106 detects. In particular, the risk inheritance system 106 detects the first user account 300 requesting the cloud computing system 102 perform the first propagation action 312 of creating a new user. As mentioned, in some instances, the risk inheritance system 106 detects the propagation event 310 based on the first user risk score 304 signaling that the first user account 300 is a risky user.

Based on the request, the cloud computing system 102 creates or generates a new user, as shown at Time C. For example, the cloud computing system 102 generates the second user account 320 having the second user identifier 322. Additionally, based on the risk inheritance system 106 detecting that the first user account 300 triggered the propagation event 310, the risk inheritance system 106 causes the newly created, second user account 320 to inherit the first user risk score 304 from the first user account 300. As shown, the second user account 320 includes the first user risk score 304 upon being created at Time C. For example, if the first user risk score 304 of the first user account 300 has a value of 90/100, then the second user account 320 will inherit a user risk score of 90/100 upon being created.

As shown, FIG. 3B corresponds to inviting an external guest user to become a user of the cloud computing system 102. FIG. 3B includes the cloud computing system 102 having the first user account 300, the risk inheritance system 106, and a guest user account 330. FIG. 3B also includes a second timeline from Time A to Time B to Time C.

As shown, the first user account 300 includes the first user identifier 302 and the first user risk score 304, as introduced above. The risk inheritance system 106 includes the propagation event 310 having a second propagation action 314, which involves inviting a guest user. The guest user account 330 includes a guest user identifier 332 and inherits the first user risk score 304.

Starting at Time A, the first user account (e.g., the first user) with the first user identifier 302 signs into the cloud computing system 102. In response, the risk inheritance system 106 generates the first user risk score 304 for the first user account 300. In some instances, the first user risk score 304 generated by the risk inheritance system 106 indicates that the first user is a risky user.

At Time B, the first user account 300 initiates a propagation event 310, which the risk inheritance system 106 detects. In particular, the risk inheritance system 106 detects the first user account 300 requesting the cloud computing system 102 to perform the second propagation action 314 of inviting a guest user to join the cloud computing system 102. As mentioned, in some instances, the risk inheritance system 106 detects the propagation event 310 based on the first user being a risky user.

Based on the request by the first user, the cloud computing system 102 invites a guest user, resulting in the creation of the guest user account 330 identified by the guest user identifier 332. Creation of the guest user account 330 is shown at Time C.

Additionally, based on the risk inheritance system 106 detecting that the first user account 300 triggered the propagation event 310, the risk inheritance system 106 causes the newly created, guest user account 330 to inherit the first user risk score 304 from the first user account 300. As shown, the guest user account 330 includes the first user risk score 304 upon being created at Time C.

As shown, FIG. 3C corresponds to assigning roles to another user of the cloud computing system 102. FIG. 3C includes the cloud computing system 102 having the first user account 300, the second user account 320 (at two different times), and the risk inheritance system 106. FIG. 3C also includes a second timeline from Time A to Time B to Time C.

The first user account 300 includes the first user identifier 302 and the first user risk score 304, as introduced above, along with first user roles 306. The second user account 320 initially (at Time A) includes the second user identifier 322 and a second user risk score 324. The risk inheritance system 106 includes the propagation event 310 having a third propagation action 316, which involves assigning roles from the first user to the second user. Assigning roles may include assigning new or increased roles to another cloud entity.

As used in this disclosure, the term "user roles" refers to specific responsibilities and permissions granted to users and/or entities interacting with the cloud infrastructure and services. In various implementations, the user roles within the cloud computing system 102 help ensure security, manage resources efficiently, and maintain compliance.

In FIG. 3C, starting at Time A, the first user account (e.g., the first user) having the first user identifier 302 signs into the cloud computing system 102. In response, the risk inheritance system 106 generates the first user risk score 304 for the first user account 300. Additionally, the risk inheritance system 106 may determine the second user risk score 324 for the second user account 320 based on the second user signing into the cloud computing system 102. In some implementations, the second user account 320 has an older or expired version of the second user risk score 324 as the second user has not signed in for a period of time (e.g., in these implementations, the second user does not sign in at Time A).

At Time B, the first user account 300 initiates a propagation event 310, which the risk inheritance system 106 detects. In particular, the risk inheritance system 106 detects the first user account 300 requesting the cloud computing system 102 to perform the third propagation action 316 of assigning roles from the first user to the second user within the cloud computing system 102. As mentioned, in some instances, the risk inheritance system 106 detects the propagation event 310 based on the first user being a risky user.

Based on the request by the first user, the cloud computing system 102 assigns the first user roles 306 to the second user account 320, as shown at Time C. This allows the second user account 320 the same rights, privileges, and authorizations as the first user account 300. As shown, the second user account 320 has no user roles at Time A and then has the first user roles 306 at Time C.

Additionally, based on the risk inheritance system 106 detecting that the first user account 300 triggered the propagation event 310, the risk inheritance system 106 causes the second user account 320 to also inherit the first user risk score 304 from the first user account 300. As shown, the second user account 320 includes the first user risk score 304 at Time C. As also shown, the first user risk score 304 overwrites the second user risk score 324 (e.g., based on the original second user risk score being lower or less risky than the first user risk score). While the first user risk score 304 is shown, in some instances, the risk inheritance system 106 updates the second user risk score 324 to match the first user risk score 304 of the first user account 300.

In some implementations, the risk inheritance system 106 prevents the second user account 320 from removing or overwriting the first user risk score 304 for a period of time. For example, if the second user account 320 signs in after being assigned the first user risk score 304, the risk inheritance system 106 does not generate a new user risk score (or lower user risk score) for the second user account 320 if a threshold time period has not passed and/or as long as the first user risk score 304 has not changed. This way, the risk inheritance system 106 ensures that the second user account

320 is not used to obtain a lower user risk score and serves as a proxy for the risky first user.

As mentioned above, FIGS. 4A-4B correspond to service principal-based propagation events according to some embodiments. In particular, FIGS. 4A-4B illustrate block diagrams showing examples of assigning user risk scores to service principals.

Figure 4A:
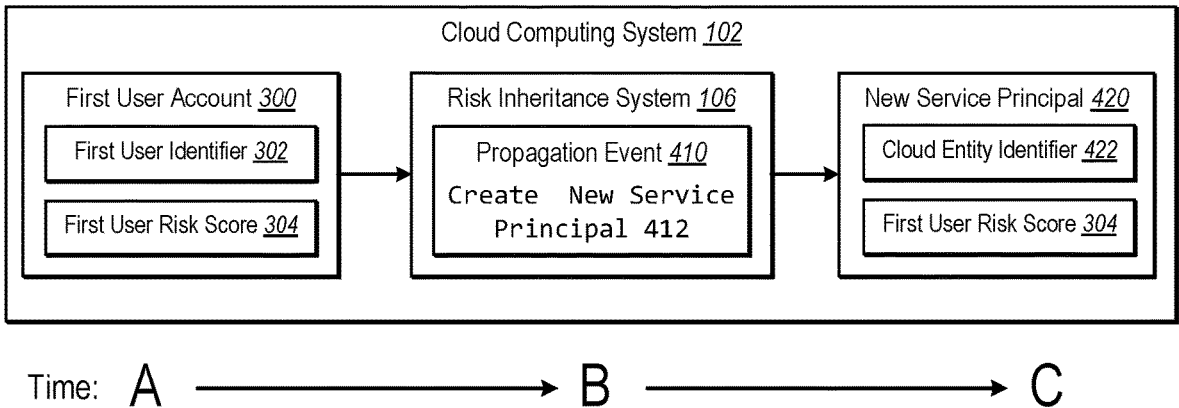
FIGS. 4A-4B illustrate block diagrams showing examples of assigning user risk scores to service principals.
Figure 4B:
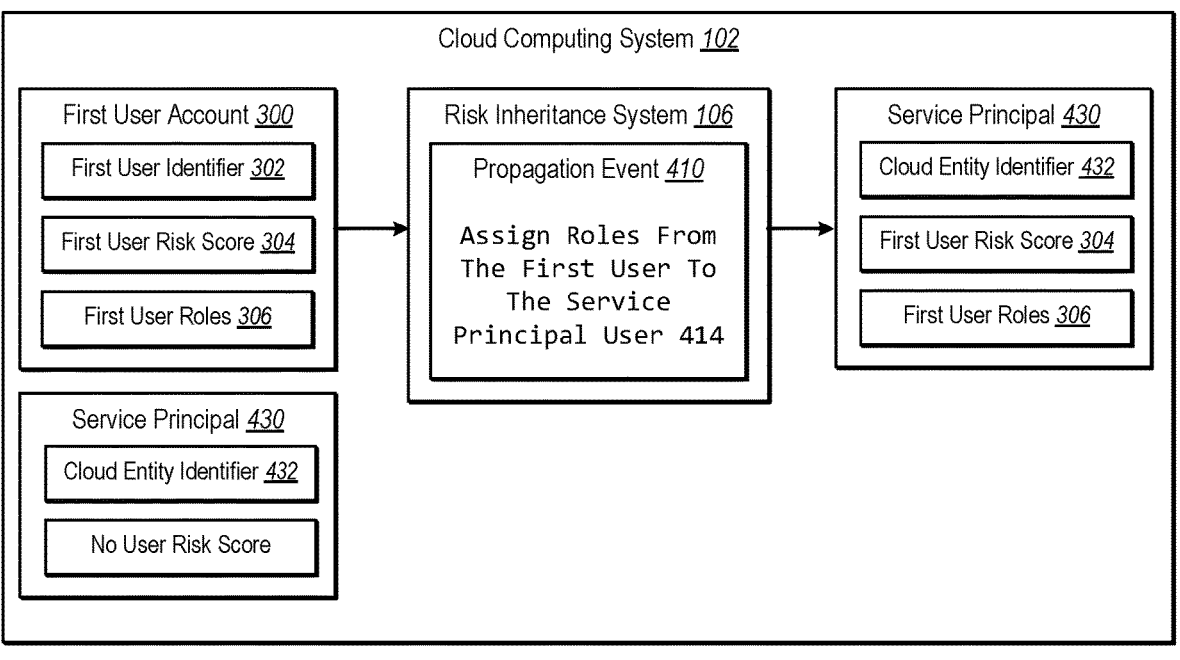

As shown, FIG. 4A corresponds to creating a new service principal in the cloud computing system 102. FIG. 4A includes the cloud computing system 102 having the first user account 300, the risk inheritance system 106, and a new service principal 420. FIG. 4A also includes a first timeline from Time A to Time B to Time C.

As shown, the first user account 300 includes a first user identifier 302 and a first user risk score 304. The risk inheritance system 106 includes a propagation event 410 having a first propagation action 412, which involves creating a new service principal. The new service principal 420 includes a cloud entity identifier 422 and inherits the first user risk score 304.

Starting at Time A, the first user account (e.g., the first user) having the first user identifier 302 signs into the cloud computing system 102. In response, the risk inheritance system 106 generates the first user risk score 304 for the first user account 300.

At Time B, the first user account 300 initiates a propagation event 410, which the risk inheritance system 106 detects. In particular, the risk inheritance system 106 detects the first user account 300 requesting the cloud computing system 102 to perform a first propagation action 412 of creating a new service principal. As noted above, in many implementations, service principals are non-human entities that represent applications or services rather than a user. In various instances, the risk inheritance system 106 detects the propagation event 410 based on the first user risk score 304 signaling that the first user account 300 is a risky user.

Based on the request, the cloud computing system 102 generates a new service principal for the first user account 300, as shown at Time C. For example, the cloud computing system 102 generates the new service principal 420 having the cloud entity identifier 422. Additionally, based on the risk inheritance system 106 detecting that the first user account 300 triggered the propagation event 410, the risk inheritance system 106 causes the new service principal 420 to inherit the first user risk score 304 from the first user account 300. This is significant because service principals previously did not have risk scores and could previously be used to evade methods that prevented problematic behavior for risky users.

As shown, FIG. 4B corresponds to assigning roles to an existing service principal in the cloud computing system 102. FIG. 4B includes the cloud computing system 102 having the first user account 300, the service principal 430 (at two different times), and the risk inheritance system 106. FIG. 4B also includes a second timeline from Time A to Time B to Time C.

For example, the first user account 300 includes the first user identifier 302 and the first user risk score 304, as introduced above, along with first user roles 306. The service principal 430 initially (at Time A) includes the cloud entity identifier 432 (and no user risk score). The risk inheritance system 106 includes the propagation event 410 having a second propagation action 414 of assigning roles from the first user to the service principal 430.

In FIG. 4B, Starting at Time A, the first user account (e.g., the first user) having the first user identifier 302 signs into the cloud computing system 102. In response, the risk inheritance system 106 generates the first user risk score 304 for the first user account 300. As the service principal 430 is not a user, the risk inheritance system 106 does not generate a risk score for it.

At Time B, the first user account 300 initiates a propagation event 410, which the risk inheritance system 106 detects. In particular, the risk inheritance system 106 detects the first user account 300 requesting the cloud computing system 102 to perform the second propagation action 414, which involves assigning roles from the first user to the service principal within the cloud computing system 102. As mentioned, in some instances, the risk inheritance system 106 detects the propagation event 410 based on the first user being a risky user.

Based on the request by the first user, the cloud computing system 102 assigns the first user roles 306 to the service principal 430, as shown at Time C. This allows the service principal 430 the same rights, privileges, and authorizations as the first user account 300. As shown, the service principal 430 has no user roles at Time A and then has the first user roles 306 at Time C.

Additionally, based on the risk inheritance system 106 detecting that the first user account 300 triggered the propagation event 410, the risk inheritance system 106 causes the service principal 430 to also inherit the first user risk score 304 from the first user account 300. As shown, the risk inheritance system 106 adds the first user risk score 304 to the service principal 430 at Time C. If the service principal did include a previous user risk score (e.g., from a previous role-based assignment), the risk inheritance system 106 may overwrite it with the first user risk score 304.

Figure 5:
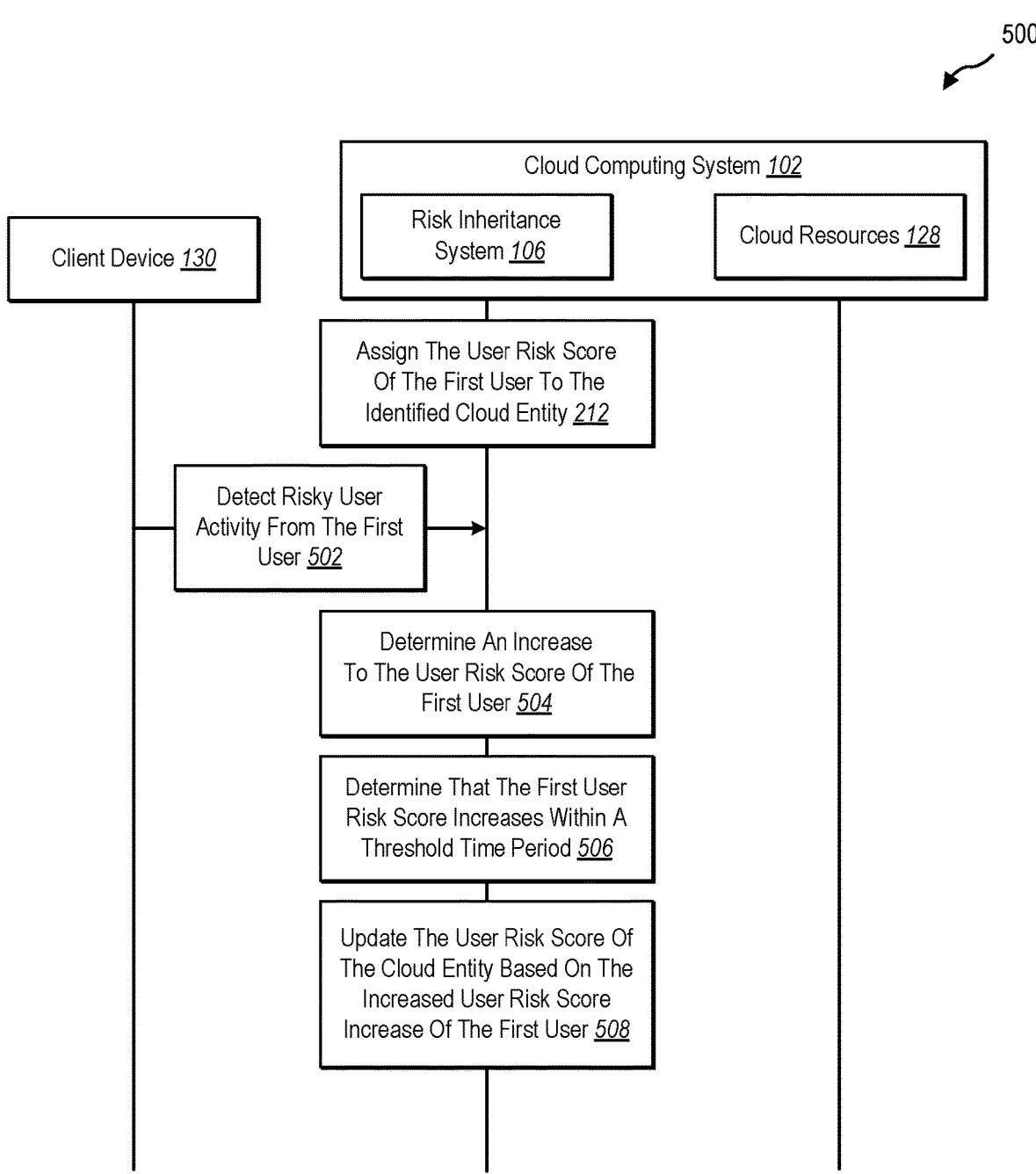
FIG. 5 illustrates an example sequence flow diagram of updating a user risk score of a cloud entity within a cloud computing system.

FIG. 5 illustrates an example sequence flow diagram of updating a user risk score of a cloud entity within a cloud computing system according to some embodiments. FIG. 5 describes the concepts of immediate risk score propagation and deferred risk score propagation. In general, immediate risk score propagation refers to a cloud entity inheriting the current user risk score of a first user upon the first user triggering a propagation event for the cloud entity. Deferred risk score propagation refers to tracking and linking the user risk score relationship between the parent cloud entity (e.g., the first user) and the child cloud entity (e.g., the cloud entity) over time.

To elaborate, FIG. 5 includes a series of acts 500 implemented by the risk inheritance system 106 within the cloud computing system 102 in conjunction with the cloud resources 128 within the cloud computing system 102 and the client device 130, which were introduced earlier. FIG. 5 continues from act 212 of assigning the user risk score of the first user to the identifier cloud entity (e.g., the second cloud entity), which is described above in connection with FIG. 2.

As shown, the series of acts 500 includes act 502 of detecting risky user activity from a first user. For example, the first user performs risky actions and/or misuses the cloud resources 128 of the cloud computing system 102. The first user may perform several actions to affect their user risk score.

Act 504 shows the risk inheritance system 106 determining an increase in the user risk score of the first user. For instance, based on the first user's risky actions, the risk inheritance system 106 uses the security risk model to update the first user risk score. In some instances, the first user re-signs in and a new first user risk score is generated that is higher than the previous user risk score.

As shown, act 506 includes determining that the user risk score increases within a threshold time period. For instance, the risk inheritance system 106 determines that the increased score of the first user risk score occurred within a specified time period, such as a predefined number of hours or days. In some instances, the risk inheritance system 106 omits this act.

Act 508 shows the risk inheritance system 106 updating the user risk score of the cloud entity based on the increased user risk score of the first user. For example, the risk inheritance system 106 matches the inherited user risk score of the cloud entity to the increased first user risk score. In some implementations, the risk inheritance system 106 applies the same point or percentage score increase to the inherited user risk score of the cloud entity as determined for the increased first user risk score. This way, the risk inheritance system 106 maintains the inherited risk score of the cloud entity as a deferred risk score, at least for a particular period of time.

In general, the risk inheritance system 106 increases the user risk score of the cloud entity when the first user risk score of the first user increases. This prevents a first user from propagating multiple cloud entities (e.g., new users or service principals) while having a low risk score, then performing risky activity on each one until their respective risk score becomes too high to access the cloud resources 128 of the cloud computing system 102. In some implementations, the risk inheritance system 106 may lower the user risk score of the cloud entity when the first user risk score of the first user decreases.

Figure 6:
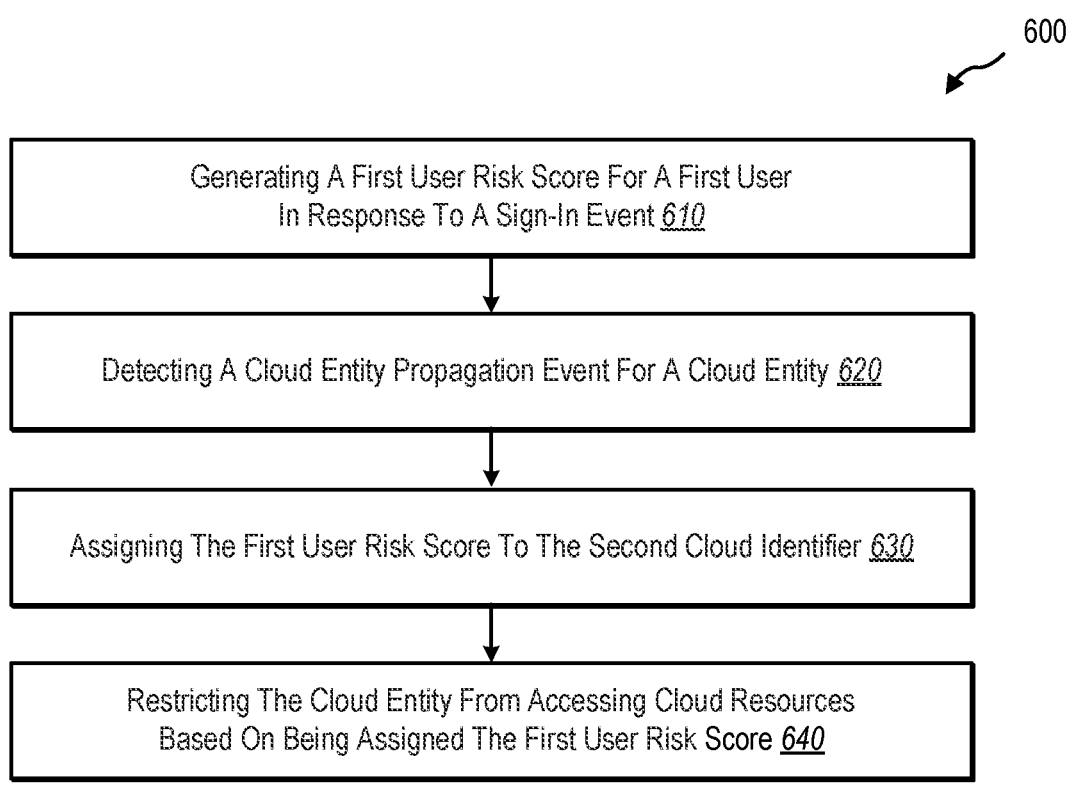
FIG. 6 illustrates an example series of acts of a computer-implemented method for generating security incident reports with context-based insights in a cloud computing system.

Turning now to FIG. 6, this figure illustrates an example flowchart that includes a series of acts 600 for using the risk inheritance according to some implementations. In particular, FIG. 6 illustrates an example series of acts for preventing risky activity evasion in a cloud computing system according to some implementations.

While FIG. 6 illustrates acts according to one or more implementations, alternative implementations may omit, add to, reorder, and/or modify any of the acts shown. Furthermore, the acts of FIG. 6 can be performed as part of a method (e.g., a computer-implemented method). Alternatively, a computer-readable medium can include instructions that, when executed by a processing system having a processor, cause a computing device to perform the acts of FIG. 6.

In some implementations, a system (e.g., a processing system comprising a processor) can perform the acts of FIG. 6. For example, the acts include a system that includes a processing system and a computer memory including instructions that, when executed by the processing system, cause the system to perform various actions or steps.

As shown, the series of acts 600 includes an act 610 of generating a first user risk score for a first user in response to a sign-in event. For instance, in example implementations, the act 610 involves generating a first user risk score for a first cloud identifier of a first user in response to a sign-in event for the first cloud identifier into the cloud computing system. In one or more implementations, the act 610 includes generating the first user risk score using a risk score model based on a set of cloud entity attributes associated with the first cloud identifier. In some instances, the first user risk score is a real-time risk score or the first user risk score is an aggregated risk score.

As further shown, the series of acts 600 includes an act 620 of detecting a cloud entity propagation event for a cloud entity. For instance, in example implementations, the act 620 involves detecting the first cloud identifier initiating a cloud entity propagation event for a cloud entity having a second cloud identifier. In one or more implementations, the cloud entity propagation event includes creating a new user of the cloud computing system having the second cloud identifier, inviting a guest user of the cloud computing system having the second cloud identifier, and/or creating a service principal of the cloud computing system having the second cloud identifier.

As further shown, the series of acts 600 includes an act 630 of assigning the first user risk score to the second cloud identifier. For instance, in example implementations, the act 630 involves assigning the first user risk score of the first cloud identifier to the second cloud identifier of the cloud entity based on identifying the cloud entity propagation event. In one or more implementations, the cloud entity includes a second user or a service principal of the cloud computing system. In some instances, the cloud entity is a second user that is different from the first user. In various instances, the cloud entity is a service principal that does not initially have a user risk score.

In various implementations, one or more of the above acts are based on determining that the first user risk score satisfies a risky user threshold. In some implementations, the cloud entity propagation event includes assigning roles of the first cloud identifier to the second cloud identifier of a second user. In various implementations, assigning the first user risk score of the first cloud identifier to the second cloud identifier of the second user includes overwriting a second user risk score previously assigned to the second cloud identifier.

In some implementations, the cloud entity propagation event includes assigning roles of the first cloud identifier to the second cloud identifier of a service principal, assigning the first user risk score of the first cloud identifier to the second cloud identifier of the service principal, and adding a new user risk score to the second cloud identifier. In certain instances, the service principal did not previously have a user risk score, which the risk inheritance system 106 could treat as having the lowest risk score when comparing and assigning higher risk scores.

As further shown, the series of acts 600 includes an act 640 of restricting the cloud entity from accessing cloud resources based on being assigned the first user risk score. For instance, in example implementations, the act 640 involves restricting the cloud entity from accessing cloud resources of the cloud computing system based on the cloud entity having the first user risk score. In one or more implementations, the act 640 is based on the cloud entity having the first user risk score includes preventing the cloud entity from accessing a resource of the cloud computing system based on the first user risk score satisfying an activity threat threshold.

In some instances, the series of acts 600 includes additional acts. For example, the series of acts 600 includes the acts of detecting an increase in the first user risk score of the first cloud identifier within a threshold time period and updating the first user risk score of the second cloud identifier based on the increase in the first user risk score of the first cloud identifier.

Figure 7:
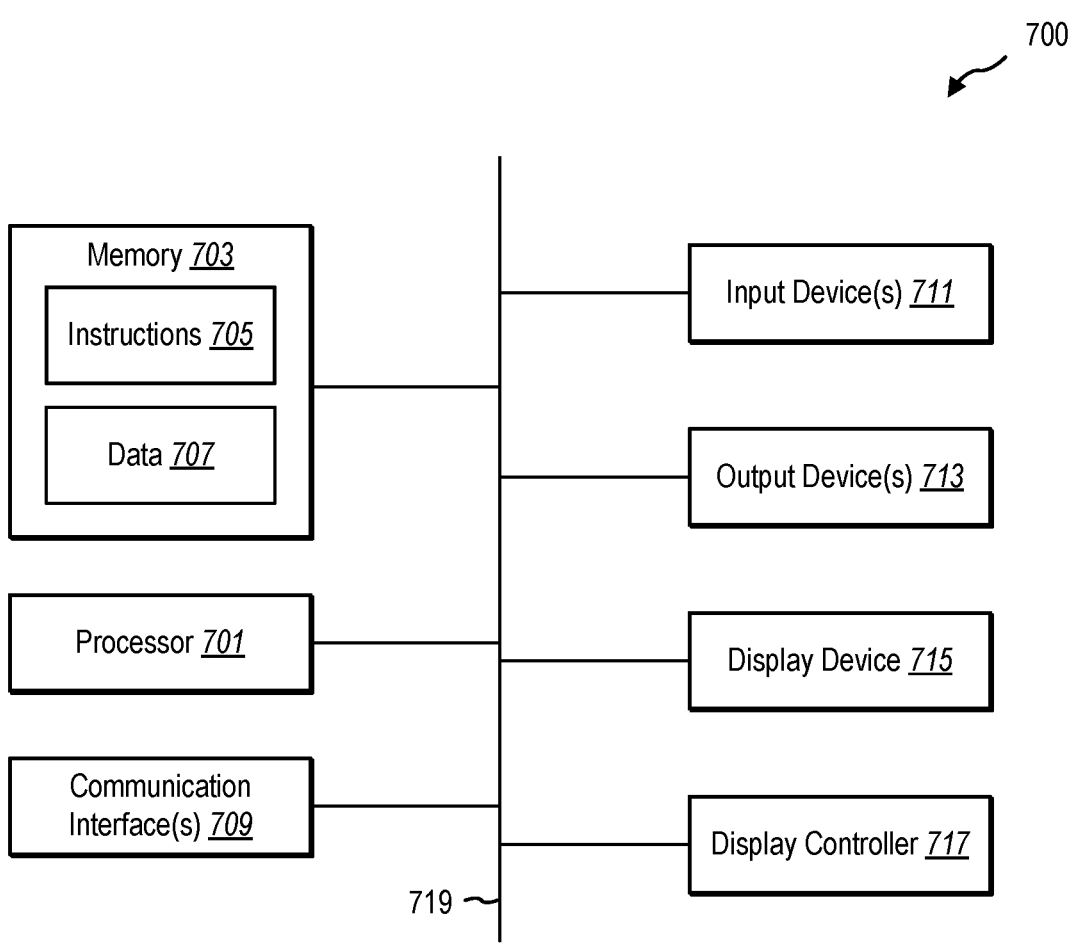
FIG. 7 illustrates example components included within a computer system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates according to an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may use any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) use transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for reducing risky activity in a computer networking environment, the computer-implemented method comprising:

generating a first user risk score associated with a first cloud identifier of a first user in response to a sign-in event of the first user;

detecting a cloud entity propagation event associated with the first cloud identifier, the cloud entity propagation event involving assigning roles of the first cloud identifier to a cloud entity having a second cloud identifier, creating the cloud entity having the second cloud identifier, or inviting the cloud entity having the second cloud identifier;

based on identifying the cloud entity propagation event, assigning the first user risk score of the first cloud identifier to the second cloud identifier of the cloud entity; and restricting the cloud entity from accessing cloud resources of a cloud computing system based on the cloud entity having the first user risk score.

2. The computer-implemented method of claim 1, wherein the cloud entity includes a second user or a service principal of the cloud computing system.

3. The computer-implemented method of claim 1, wherein assigning the first user risk score to the second cloud identifier is based on determining that the first user risk score satisfies a risky user threshold.

4. The computer-implemented method of claim 1, wherein the cloud entity propagation event includes creating a new user of the cloud computing system the second cloud identifier.

5. The computer-implemented method of claim 4, wherein the cloud entity propagation event includes inviting a guest user of the cloud computing system having the second cloud identifier.

6. The computer-implemented method of claim 1, wherein the cloud entity propagation event includes assigning the roles of the first cloud identifier to the second cloud identifier of a second user.

7. The computer-implemented method of claim 6, wherein assigning the first user risk score of the first cloud identifier to the second cloud identifier of the second user includes overwriting a second user risk score previously assigned to the second cloud identifier.

8. The computer-implemented method of claim 1, wherein the cloud entity propagation event includes assigning the roles of the first cloud identifier to the second cloud identifier of a service principal.

9. The computer-implemented method of claim 8, wherein assigning the first user risk score of the first cloud identifier to the second cloud identifier of the service principal includes adding a new user risk score to the second cloud identifier, and wherein the service principal did not previously have a user risk score.

10. The computer-implemented method of claim 1, wherein the cloud entity propagation event includes creating a service principal of the cloud computing system having the second cloud identifier.

11. The computer-implemented method of claim 1, wherein the first user risk score is a real-time risk score.

12. The computer-implemented method of claim 1, wherein the first user risk score is an aggregated risk score.

13. The computer-implemented method of claim 1, further comprising generating the first user risk score using a risk score model based on a set of cloud entity attributes associated with the first cloud identifier.

14. The computer-implemented method of claim 1, wherein restricting the cloud entity from accessing the cloud resources of the cloud computing system based on the cloud entity having the first user risk score includes preventing the cloud entity from accessing a resource of the cloud computing system based on the first user risk score satisfying an activity threat threshold.

15. A computer-implemented method for reducing risky activity in a computer networking environment, the computer-implemented method comprising:

generating a first user risk score associated with a first cloud identifier of a first user in response to a sign-in event;

determining that the first user risk score satisfies a risky user threshold;

detecting a cloud entity propagation event associated with the first cloud identifier, the cloud entity propagation event involving creation of a new cloud entity having a second cloud identifier; and based on identifying the cloud entity propagation event and the first user risk score satisfying the risky user threshold, assigning the first user risk score of the first cloud identifier to the second cloud identifier of the new cloud entity.

16. The computer-implemented method of claim 15, further comprising:

detecting an increase in the first user risk score of the first cloud identifier within a threshold time period; and updating the first user risk score for the second cloud identifier based on the increase in the first user risk score associated with the first cloud identifier.

17. The computer-implemented method of claim 15, wherein:

the new cloud entity is a second user that is different from the first user;

the cloud entity propagation event includes creating the second user of a cloud computing system having the second cloud identifier; and assigning the first user risk score of the first cloud identifier to the second cloud identifier of the second user includes assigning the first user risk score to the second cloud identifier.

18. A system for reducing risky activity in a cloud computing system, the system comprising:

a processing system; and a computer memory comprising instructions that, when executed by the processing system, cause the system to perform operations of:

generating a first user risk score associated with a first cloud identifier of a first user in response to a sign-in event of the first user to the cloud computing system;

determining that the first user risk score satisfies a risky user threshold;

detecting a cloud entity propagation event associated with the first cloud identifier, the cloud entity propagation event involving assignment of roles of the first cloud identifier to a cloud entity having a second cloud identifier; and based on identifying the cloud entity propagation event and the first user risk score satisfying the risky user threshold, assigning the first user risk score of the first cloud identifier to the second cloud identifier of the cloud entity.

19. The system of claim 18, wherein:

the cloud entity is a service principal that does not initially have a user risk score;

the cloud entity propagation event includes assigning the roles of the first cloud identifier to the second cloud identifier of the service principal; and assigning the first user risk score of the first cloud identifier to the second cloud identifier of the service principal includes adding a new user risk score to the second cloud identifier.

20. The system of claim 18, wherein:

the cloud entity is a second user that is different from the first user;

the cloud entity propagation event includes assigning the roles of the first cloud identifier to the second cloud identifier of the second user; and assigning the first user risk score of the first cloud identifier to the second cloud identifier of the second user includes overwriting a second user risk score previously assigned to the second cloud identifier.

\* \* \* \* \*